(12) United States Patent
Vashisht et al.

(10) Patent No.: US 11,227,047 B1
(45) Date of Patent: Jan. 18, 2022

(54) SYSTEM AND METHOD FOR IMPROVED END-TO-END CYBERSECURITY MACHINE LEARNING AND DEPLOYMENT

(71) Applicant: FireEye Security Holdings US LLC, Milpitas, CA (US)

(72) Inventors: Sai Omkar Vashisht, Morgan Hill, CA (US); Rahul Khul, Pune (IN); Chunsheng Fang, Cupertino, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 306 days.

(21) Appl. No.: 16/049,687

(22) Filed: Jul. 30, 2018

Related U.S. Application Data

(60) Provisional application No. 62/692,345, filed on Jun. 29, 2018.

(51) Int. Cl.
*G06F 21/55* (2013.01)
*G06F 21/56* (2013.01)
*G06N 20/00* (2019.01)

(52) U.S. Cl.
CPC ............ *G06F 21/554* (2013.01); *G06F 21/56* (2013.01); *G06N 20/00* (2019.01); *G06F 2221/034* (2013.01)

(58) Field of Classification Search
None
See application file for complete search history.

(56) References Cited

U.S. PATENT DOCUMENTS

| | | | |
|---|---|---|---|
| 9,690,933 B1* | 6/2017 | Singh | G06N 5/045 |
| 2014/0053261 A1* | 2/2014 | Gupta | G06F 8/61 |
| | | | 726/22 |
| 2016/0028751 A1* | 1/2016 | Cruz Mota | H04L 63/1408 |
| | | | 726/23 |
| 2016/0275288 A1* | 9/2016 | Sethumadhavan | |
| | | | H04L 63/0428 |
| 2016/0352761 A1* | 12/2016 | McGrew | H04L 63/1408 |
| 2017/0103341 A1* | 4/2017 | Parthasarathy | G06N 20/00 |
| 2017/0244741 A1* | 8/2017 | Ferrer | G06Q 50/01 |
| 2017/0316284 A1* | 11/2017 | Chang | G06K 9/6256 |
| 2018/0219887 A1* | 8/2018 | Luo | H04L 63/14 |
| 2018/0219889 A1* | 8/2018 | Oliner | G06N 3/08 |
| 2019/0064752 A1* | 2/2019 | Marwah | G06N 20/00 |

\* cited by examiner

*Primary Examiner* — Cheng-Feng Huang
*Assistant Examiner* — Bassam A Noaman
(74) *Attorney, Agent, or Firm* — Cooley LLP

(57) ABSTRACT

The presently disclosed subject matter includes an apparatus that receives a dataset with values associated with different digital resources captured from a group of compute devices. The apparatus includes a feature extractor, to generate a set of feature vectors, each feature vector from the set of feature vectors associated with a set of data included in the received dataset. The apparatus uses the set of feature vectors to validate multiple machine learning models trained to determine whether a digital resource is associated with a cyberattack. The apparatus selects at least one active machine learning model and sets the remaining trained machine learning models to operate in an inactive mode. The active machine learning model generates a signal to alert a security administrator, blocks a digital resource from loading at a compute device, or executes other remedial action, upon a determination that the digital resource is associated with a cyberattack.

20 Claims, 4 Drawing Sheets

SYSTEM AND METHOD FOR IMPROVED END-TO-END CYBERSECURITY MACHINE LEARNING AND DEPLOYMENT

CROSS-REFERENCE TO RELATED APPLICATIONS

This application claims priority to and the benefit of U.S. Provisional Application No. 62/692,345, entitled "System Method for Improved End-to-End Cybersecurity Machine Learning and Deployment," filed Jun. 29, 2018, which is incorporated herein by reference in its entirety.

TECHNICAL FIELD

The present disclosure relates generally to the detection and remediation of cyberattacks via machine learning systems and more specifically to self-adapting detection systems.

BACKGROUND

Cyber threat actors are increasingly targeting computer networks, industrial control systems, and personal computers of private and public users. The means and methods that attackers use to compromise third-party systems change dramatically over time. Cyber threats have bypassed known security protection techniques and often reside undetected in compromised compute devices. The delay in identifying cyber-intrusions can have profound consequences. The longer a compute device remains compromised, the greater the opportunity is for an attacker to propagate and affect other compute devices operatively coupled to the compromised compute device.

Thus, a need exists for sophisticated cybersecurity systems capable to evolve along with the ever-changing cyber threat landscape.

SUMMARY

The presently disclosed subject matter includes an apparatus that receives a dataset with values associated with different digital resources captured from a group of compute devices. The apparatus validates multiple machine learning models trained to determine whether a digital resource is associated with a cyberattack. The apparatus selects a trained machine learning model to be an active machine learning model and may set the remaining trained machine learning models to operate in an inactive mode. In various embodiments, the active machine learning model is configured to generate a signal to initiate an alert or report to a security administrator or take remedial action such as to block a digital resource from loading at a compute device upon a determination that the digital resource is associated with a cyberattack.

DETAILED DESCRIPTION

Figure 1:
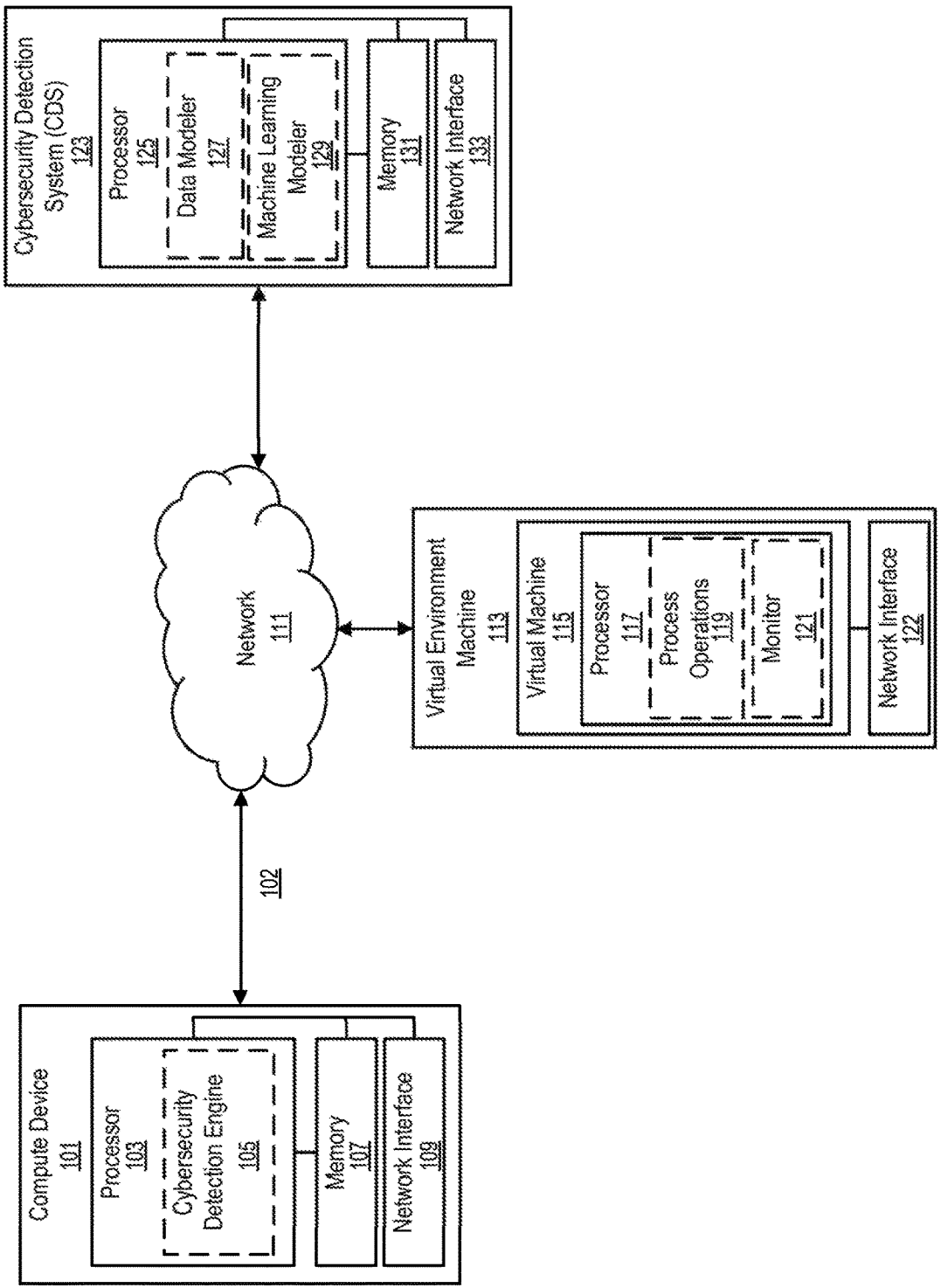
FIG. 1 is a block diagram illustrating an example of a cybersecurity detection system coupled to a compute device via a computer network, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

Cybersecurity threats are emerging at faster rates and becoming more sophisticated, making them harder to detect and mitigate quickly. Some new forms of malware can propagate at high speeds with no human intervention and/or can change or manifest differently on each new infection. Equipped with complex evasion techniques, malware can be concealed and transmitted in encrypted and obfuscated messages unbeknownst to users and organizations. Compromised users and organizations are susceptible to fraud, identity theft, extortion, data loss, spam distribution, and distributed denial of service attacks, for example. Some of the challenges of cybersecurity systems include detecting persistent and/or targeted threats, analyzing large amounts of data, and responding to threats in real-time.

In particular, known signature-based cybersecurity solutions can be inadequate to detect polymorphic malware and zero-day attacks. Zero-day attacks exploit security vulnerabilities before a patch or fix is available. Such vulnerabilities are usually discovered by attackers and become known to cybersecurity personnel after targeted systems are already compromised. Polymorphic malware is designed to Tactics, techniques, and procedures (TTPs) get at how threat agents (the bad guys) orchestrate and manage attacks. "Tactics" is also sometimes called "tools" in the acronym. Specifically, TTPs are the "patterns of activities or methods associated with a specific threat actor or group of threat actors to evade signature-based detection on each new infection. The absence or shortage of information about identifiable features of new or polymorphic malware combined with security vulnerabilities allows attackers to compromise systems and remain undetected for ample periods of time to potentially cause irreparable harm.

Cybersecurity systems configured based on machine learning techniques can be a superior alternative to customary signature-based cybersecurity solutions. Machine learning systems can implement computational methods that use past information to make accurate predictions with respect to suspicious digital resources, integrating data collected at different times, from different data sources, and different complexity into robust threat detection systems. In particular, fine-tuned cybersecurity systems can generate accurate predictions for even unidentified or unseen digital resources associated with zero-day and other attacks, eliminating or substantially minimizing the number of digital resources incorrectly classified as trusted or benign resources (False Negatives) and the number of digital resources incorrectly classified as malicious resources (False Positives). In cybersecurity, False Negatives and False Positives are particularly undesired; the former tend to decrease the confidence that cybersecurity personnel place in cybersecurity systems while the latter can hide from view, and divert remedial attention from, actual malicious resources ("True Positives") to thereby expose information technology (IT) infrastructure to irreparable damage. A digital resource can include different types of digital media, software applications, and other types of processor-executable or -interpretable code, some examples include emails, text documents, files, scripts, web content, digital images, videos, and other types of digital data.

Machine learning employs statistical and computational data-driven techniques to give computers the ability to "learn," that is, to progressively improve performance on a specific task, in the present case, to predict whether a digital resource is part of a cyberattack. Machine learning techniques implement a machine learning model, developed and "tuned" for accuracy using previously labeled datasets, in this case, for example, both malicious and benign digital resources, prior to applying the model to unlabeled datasets.

The success of machine learning techniques can depend on the model selected and the data used for its training, validation, and testing. The tuning of implemented machine learning models can also be a relevant factor. Tuning refers to the process of maximizing a model's performance (e.g., generalization capacity) without overfitting or creating high variance in the tasks the model is trained to perform. Because the cybersecurity threat landscape is extremely dynamic, the accuracy or error rate of a deployed machine learning model can deteriorate over time as new and more sophisticated forms of malware are released. In some instances, a deployed machine learning model can be re-tuned to increase its generalization capacity, e.g., the capacity to accurately identify new cyber threats. In some other instances, new forms of malware can be significantly different than the types of malware known at the time of training a machine learning model such that different machine learning models can be found superior at a later time than the ones originally selected for deployment. Differently stated, after deployment, even the most finely-tuned machine learning model can become underfitted.

In the context of cybersecurity, maintaining a finely-tuned machine learning model is paramount to the early detection and remediation of cyber threats. Tuning machine learning models, however, is a complex task that often demands resources including expert knowledge, time, and in-depth experimentation. Moreover, complex manners in which malware propagates, evolves, and remains concealed in compromised systems are often beyond what humans can readily identify or understand.

Thus, a need exists for systems that can evolve along with the cybersecurity threat landscape. Specifically, a need exists for solutions that address the daunting task of tuning machine learning models at a pace demanded by the cybersecurity threat landscape. Accordingly, an improved cybersecurity system is provided for the automated deployment of finely-tuned machine learning models, regulated based on datasets collected from multiple and distributed compute devices, ensuring that an optimal (or near optimal) cyber threat detection system is continuously operating in a compute device or at a production or enterprise network level.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Attention is now drawn to FIG. 1, which shows a compute device 101 in communication via the network 111 with a cybersecurity detection system (CDS) 123, and a virtual environment machine 113. Although the compute device 101, the virtual environment machine 113, and CDS 123 are shown in FIG. 1 as being implemented in different compute devices, it is understood that two more of the systems 101, 113, and/or 123 can be implemented in a single compute device. For instance, in some implementations, compute device 101 can also implement the virtual environment machine 113.

Network 111 can include one or more types of computer networks. For example, computer networks can include any one of: the Internet, Local Area Network (LAN), Wide Area Network (WAN), Metropolitan Area Network (MAN), mobile networks, or any combination thereof. Compute devices connected to the computer network 111 can be implemented through any suitable connection (including wired or wireless) and communication technology or standard.

In the illustrated example, computer network 111 is coupled to compute device 101, CDS 115, and virtual environment machine 113. The various compute devices coupled to network 111 and shown in FIG. 1 are operable to communicate over network communication links. Solid lines connecting different computerized devices illustrated in FIG. 1 indicate communication links, for instance the doubled arrow solid line 102 between compute device 101 and computer network 111.

Compute device 101 includes processor 103, memory 107, and network interface 109. Compute device 101 implements a cybersecurity detection engine 105 via the processor 103. The cybersecurity detection engine 105 can include executable logic in the form of processor executable code, an application programming interface (API) to communicate with, for example, virtual machine environment 113 and/or CDS 123, dynamic load libraries, and other suitable type of processor executable instructions.

The processor 103 executes instructions or code stored in the memory 107 including instructions to implement and run the cybersecurity detection engine 105 and other components included in compute device 101. The compute device 101 communicates with other compute devices coupled to the network 111 via the network interface 109.

In some implementations, the compute device 101 can be implemented in a client compute device. In some other implementations, the compute device 101 can be implemented in an appliance such as a network-attached storage device, a server, or other suitable compute device connected to a home or enterprise network (not shown in FIG. 1). The cybersecurity detection engine 105 implements one or more machine learning models deployed by the cybersecurity detection system 115. In some instances, the cybersecurity detection engine 105 analyzes digital resources received via network interface 109 or a communication interface or port implemented at compute device 101.

A digital resource can be considered as a distinct and self-contained object for purposes of analysis, and in other circumstances is associated with (for example, contained in) one or more "data flows" which generally refer to data patterns based on data packets received, transmitted, or exchanged within a communication session (e.g., a communication session between compute device 101 and a third-party server). A data packet can be broadly defined as a series of bits or bytes having a prescribed format often according to a communication protocol.

In some implementations, cybersecurity detection engine 105 implements a first machine learning model configured to operate in an active mode such that, the first machine learning model executes, for example, remedial and/or filtering actions based on the analyzed digital resources. Remedial actions can include blocking a digital resource, sending a notification of a suspicious digital resource to a cybersecurity personnel, and other suitable actions. Filtering actions can include analyzing digital resources only when there is a probability that such digital resources are malicious while excluding from analysis those digital resources known to be not malicious or benign. Alternatively or additionally, cybersecurity detection engine 105 can implement a second machine learning model configured to operate in a "learning" mode. In such a case, the second machine learning model analyzes digital resources in parallel to the first machine learning model however, the second machine learning model does not perform remedial and/or filtering actions. In some instances, the first and second machine learning model can be distinct machine learning models e.g., the first machine learning model can be a random forest model and the second machine learning model can a gradient boosted tree model. Alternatively and/or additionally the first machine learning model and the second machine learning model can operated in distinct set of features derived from digital resources.

Cybersecurity detection engine 105 sends performance data associated with the first machine learning model and the second machine learning model to CDS 123. CDS 123 collects the data and in some instances based on the received performance data, CDS 123 can send a signal to cybersecurity detection engine 105 to change the configuration of the first machine learning model from active mode to learning mode and change the configuration of the second machine learning model from learning mode to active mode. Differently stated, CDS 123 can send a signal to change the configuration mode of the first and second machine learning models upon a determination that the second machine learning model has outperformed the first machine learning model. For example, upon a determination that the second machine learning model has reached better prediction accuracy than the first machine learning model over a predetermined interval of time. For another example, upon a determination that the second machine learning model has developed better filtering techniques and thus, consumed less computational resources (e.g., processing time, memory) than the first machine learning model.

The cyber security detection engine 105 can classify digital resources and/or data flows resulting from receiving, loading, or executing digital resources at compute device 101. In some instances, cyber security detection engine 105 can classify digital resources independently of whether such digital resources are in transit (e.g., digital resources received at intermediate nodes of a production or enterprise computer network) or at rest (e.g., digital resources stored in the memory 107 or other memory coupled to compute device 101). In some other instances, cyber security detection engine 105 can classify digital resources based on statically observed characteristics of the object or data flow and/or performance patterns (behaviors) captured during execution of the object or data flow from components included in the compute device 101 (e.g., processor 103, memory 107, and network interface 109). In yet other instances, the cyber security detection engine 105 can classify digital resources based on transmission patterns and/or data flows associated with such digital resources.

In some instances, cybersecurity detection engine 105 can be configured to classify digital resources and transmission patterns associated with digital resources aiming to compromise compute device 101 or other compute devices coupled operatively to compute device 101. Cybersecurity detection engine 105 can use different types of data obtained from digital resources, and/or performance characteristics of computer resources to determine whether a digital resource is part of or is associated with a cyberattack.

In some instances, the cybersecurity detection engine 105 determines that a digital resource is malicious when such classification (e.g., malicious) is produced with a confidence value that is over a predetermined threshold value, and thus, can activate an alert, execute quarantine process, block the loading or execution of the digital resource, and/or take other action to protect against the digital resource classified as malicious or determined to be part of a cyberattack (e.g., a type of malware). In some other instances, when the cybersecurity detection engine 105 cannot determine with a minimum confidence value whether a digital resource is not malicious, the cybersecurity detection engine 105 can send via network interface 109 the digital resource to be further inspected off-band at virtual environment machine 113.

In some instances, when the cybersecurity detection engine 105 produces a seemingly False Negative classification value or a False Positive classification value for a given digital resource, the digital resource is labeled with the produced classification value and sent to the CDS 123 for further analysis through one or more machine learning models implemented in CDS 123. In some other instances, when the cybersecurity detection engine 105 determines that compute device 101 or other compute device operatively coupled to compute device 101 exhibits abnormal characteristics or behavior, the cybersecurity detection engine 105 can label the digital resource as suspicious and collect data flows and/or performance data of the abnormal performance of the compute device along with digital resources suspected to have caused the anomaly and sends these data to CDS 123 for further analysis through one or more machine learning models implemented in CDS 123. The "suspicious" label can be applied, in some cases, regardless of the confidence level, or, in other cases, where the confidence level is below the threshold for a maliciousness classification and above the threshold for a benign (or not malicious) classification. For convenience in description, digital resources sent to the CDS 123 will be referred to as "suspicious digital resources." In some instances, digital resources associated with False Positive and False Negative classifications can be used to train one or more machine learning models implemented in CDS 123 with corrected classifications (e.g., associate features of digital resources determined to be False Positives as "not malicious" and associate features of digital resources determined to be False Negatives as "malicious") thus, effectively increasing the accuracy of the machine learning models.

In some instances, virtual environment machine 113 can be implemented in a compute device configured to receive via network interface 122 a suspicious digital resource not classified by the cybersecurity detection engine 105 as either "malicious" or "not malicious." In some other instances, virtual environment machine 113 can be implemented in a compute device to receive a suspicious digital resource classified "malicious" or as a seemly False Positive or False Negative. Virtual environment machine 113 processes or executes the received suspicious digital resource via processor 117 at an instantiated virtual machine 115. The set of process operations 119 executed by processor 117 associated with the processing or execution of the suspicious digital resource are monitored and collected by monitor 121.

In some instances, a digital resource can be classified as "malicious" based on anomalous characteristics, detrimental performance or abnormal behavior of virtual machine 115. For instance, monitor 121 can collect data from virtual machine 115 representing the set of process operations 119 associated with a suspicious digital resource and other suitable data likewise associated with the suspicious digital resource. The monitor 121 sends the collected data via network interface 122 to CDS 123 labeled as "malicious" along with the digital resource or a set of feature values derived from the digital resource. In some other instances, when the execution of the suspicious digital resource does not result in anomalous characteristics, detrimental performance or abnormal behavior of virtual machine 115, monitor 121 can collect the pattern or sequence representing the set of process operations 119, the suspicious digital resource, and other suitable data associated with the suspicious digital resource. Monitor 121 sends collected data via network interface 122 to CDS 123 for further cyber-security analysis, in this instance, the data can be labeled as "not malicious" or "benign." In yet some other instances, the data collected by monitor 121 can be labeled as "suspicious" when, for example, based on the collected data, the probability that a suspicious digital resource is in fact malicious does not exceeds a first threshold value nor the probability falls below a second threshold value. Differently stated, a digital resource can be labeled as "suspicious" when the probability that such a digital resource not significant enough to indicate that it is malicious nor significant enough to indicate that such digital resource is not malicious or benign. Of course, in other embodiments, other designations of the classification labels of the digital resource may be employed with similar intended meanings and to the same effect.

CDS 123 includes processor 125, which executes a data modeler 127 and machine learning modeler 129. Data modeler 127 receives via network interface 133 datasets including suspicious digital resources and data depicting anomalous behavior or performance of compute device resources from, for example, compute device 101, and virtual environment machine 113. Data modeler 127 formats, structures, and/or normalizes received datasets. Likewise data modeler 127 selects and/or extracts features included in datasets determined to be informative or strong predictors for the classification of digital resources.

Machine learning modeler 129 builds a set of trained machine learning models. Some of the operations executed by machine learning modeler 129 include training machine learning models, validating machine learning models, and testing machine learning models. Likewise, machine learning modeler 129 performs a model selection based on one or more measures of accuracy or error rate obtained from the set of trained machine learning models. In some instances, machine learning modeler 129 deploys to a production network or other compute device (e.g., compute device 101) a trained machine learning model selected from the set of trained machine learning models finely-tuned based on training datasets received, via network interface 133 from compute device 101, virtual environment machine 113, or other suitable compute device.

Figure 2:
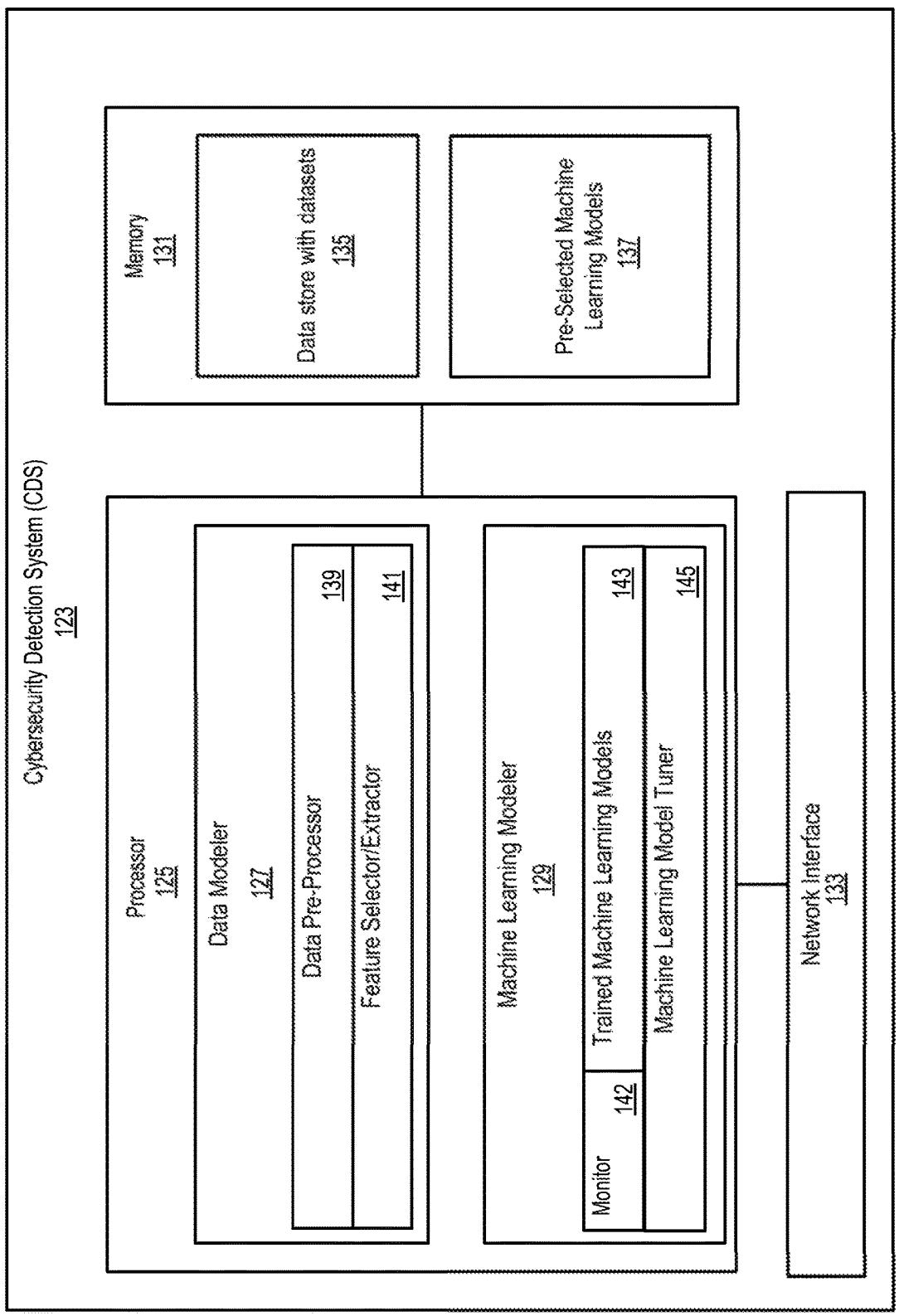
FIG. 2 is a block diagram illustrating an example of a cybersecurity detection system, according to an embodiment.

A more detailed discussion regarding internal components included in CDS 123 is provided with reference to FIG. 2. As discussed above, processors 125 implements data modeler 127 and machine learning modeler 129. In some implementations, data modeler 127 processes datasets labeled as either malicious or not malicious. Such datasets can include digital resources, data flows, characteristics, performance and/or behavioral data collected from a set of compute devices including, for example, compute device 101 and virtual environment machine 113 (discussed with reference to FIG. 1) or other suitable compute devices.

As discussed above, the datasets can include different types of data, for example, sequences or data transmission patterns in accordance with a particular communication protocol such as User Datagram Protocol (UDP), Transmission Control Protocol (TCP), Hypertext Transfer Protocol (HTTP), or other suitable communication protocol. Likewise, datasets can include inter-process communication data (i.e., data shared between two or more different processes or compute devices) and intra-process communication data (i.e., data shared within components or methods of a single process or compute device). For another example, datasets can include self-contained digital resources including executable and non-executable content such as a Portable Document Format (PDF) file, a JavaScript file, a document (e.g., a Microsoft Office® document), an electronic mail, an email attachment, a downloaded web page, an instant messaging element. For yet another example, datasets can include performance metrics collected from a compute device while that compute device processed or executed a suspicious digital resource.

In some implementations, data pre-processor 139 converts raw data values included in the datasets into data values suitable for the training, validation, testing, and optimization of a set of machine learning models. For instance, data pre-processor 139 can: (1) rescale selected values when such values are collected or received in different scales (e.g., by adding or subtracting a constant value from a collected value and/or multiplying or dividing the collected value by a constant value); (2) transform values using a binary threshold (e.g., setting values that are above a predetermined threshold value to correspond to a binary one and setting values equal or below the predetermined threshold to a binary zero); (3) standardize the values according to a Gaussian distribution with a mean of zero and a standard deviation of one; and/or other suitable data pre-processing techniques to secure high levels of optimization and accuracy of machine learning models. In some implementations, the operations executed by pre-processor 139 can be configured in a library and further include transformation of data types and data format operations, The pre-processed datasets can be stored in data store 135 in one or more data structures including, for example, vectors, tensors, and other suitable data structures.

Each data element in a dataset is known as a feature. In some implementations, feature extractor/selector 141 can select or extract for each machine learning model implemented by CDS 123 a set of features determined to be the best predictors to map an input space X (i.e., the set of all possible datasets) to targeted values (e.g., Y={malicious, not malicious}). In some instances, feature extractor/selector 141 can select features directly from a digital resource while in other instances it can extract or derived features from the digital resource (e.g., entropy or other suitable feature derived from the digital resource). In some implementations, feature selector/extractor 141 can filter irrelevant or redundant features from the raw datasets by executing, for example, variance threshold techniques to remove features whose values do not significantly change from one dataset to another and thus, are not informative as to whether a digital resource is malicious or not malicious. Likewise, feature selector/extractor 141 can execute correlation threshold techniques to remove features that are highly correlated. Differently stated, feature extractor/selector can implement one or more of the above computational techniques to filter or eliminate poor or uninformative features that can mislead the building and tuning of machine learning models.

In some implementations, feature selector/extractor 141 can include a representation machine learning model to reduce data dimensionality, producing compact representations of a set of features that characterizes a dataset. Some of the models that can be implemented for feature extraction include Principal Component Analysis (PCA), Linear Discriminant Analysis (LDA), auto-encoders, and other suitable type of feature extraction models or computing techniques. The set features selected and/or extracted from each dataset can be structured as feature vectors. A feature vector includes a set of feature values selected or extracted from each dataset. In some instances, a feature vector can include feature values marked or flagged to be used by distinct machine learning models. Sets of feature vectors can be stored in the data store 135.

In some instances, machine learning modeler 129 uses outputs produced by data pre-processor 139 and feature selector/extractor 141, stored in data store 135 to train, validate, and/or test a set of machine learning models selected from a group of pre-selected machine learning models 137 to build a set of trained machine learning models 143. Various examples are described below with respect to supervised machine learning models, however, it is contemplated that the described implementations are also applicable to other machine learning models including unsupervised machine learning models, semi-supervised machine learning models, reinforcement learning models, and other suitable machine learning models.

In some instances, machine learning modeler 129 can retrieve a set of datasets from data store 135 and randomly divide the retrieved set into three disjoint subsets of datasets. The three disjoint subsets of datasets can be used to build, train, and/or tune machine learning models. Specifically, a first subset can be used to train machine learning model's "training set," a second subset can be used to validate machine learning model's "validation set," and a third subset can be used to test machine learning model's "testing set." The disjoint subsets can include samples representative of a current cyber threat landscape i.e., samples derived from digital resources known to be malicious or part of a cyber attack (labeled as "malicious"). Likewise, the disjoint subsets can include samples labeled as "not malicious" or "benign" when is known that such samples do not represent a cyber threat. In some instances, when the number of available labeled samples is not sufficient to produce the three disjoint subsets, machine learning modeler 129 can apply a cross-validation technique such as an n-fold-cross-validation or other suitable technique to overcome training limitations associated with small amounts of labeled samples. Machine learning modeler 129 can execute different machine learning techniques to implement distinct machine learning models.

For the classification of digital resources, it is desirable that each trained machine learning model is finely tuned to approximate a mapping function $Y=f(X)$ well enough such that, each machine learning model can predict or classify as a target value Y any input X In some instances, the machine learning modeler 129 executes a training process in which the training set is used as input for a machine learning model such that the machine learning model adjusts free parameters and/or hyper-parameter of the function $f$ to approximate the value of Y given an input X.

The free parameters and/or hyper-parameters of a machine learning model can be further tuned via a validation process. During the validation process, the machine learning modeler 129 inputs the validation set into a machine learning model to estimate a generalization error of the machine learning model. The validation process can be executed during or after the training process. The generalization error is a measure of how accurately a machine learning model is able to classify a digital resource associated with input X with a targeted value Y. The machine learning modeler 129 can then evaluate a validated machine learning model using the testing set. Specifically, the machine learning modeler 129 can input the testing set into the machine learning model and determine a measure of accuracy (e.g., the proportion of samples for which the machine learning model produced a correct output) and tune hyper-parameters of the machine learning model until a generalization error reaches a predetermine threshold value, The trained machine learning models 143 includes machine learning models built and/or tuned via the training, validating and/or evaluated processed described above. Examples of trained machine learning models 143 include tree ensembles (e.g., random forests, gradient boosted trees), Support Vector Machines (SVM), feedforward neural networks with fully connected layers, convolutional neural networks, and other machine learning models suitable to perform classification tasks.

In some implementations, machine learning modeler 129 uses machine learning model tuner 145 to further tune trained machine learning models 143. Machine learning model tuner 145 can determine optimal hyper-parameters for machine learning models. Each of the pre-selected machine learning models 137 and trained machine learning models 143 can include a set of hyper-parameters. Hyper-parameters control several aspects of the behavior of a machine learning model including processing time, memory resources used to execute that machine learning model, and perhaps most relevant, the accuracy of the classifications generated by that machine learning model. For example, hyper-parameters of an SVM include regularization strength, scaling of input data, type of similarity kernel, and kernel-specific parameters. Hyper-parameters of a random forest include values or functions related to the selected heuristics to produce internal nodes, and pruning strategies for trees during and after training. Hyper-parameters of deep neural networks include the number of hidden layers in a neural network, learning rate, convolutional kernel width, implicit zero padding, weight decay coefficient, dropout rate, and other suitable hyper-parameters.

Machine learning model tuner 145 can determine optimal hyper-parameters before or during the training or validating process of a machine learning model. In some instances, machine learning model tuner 145 can optimize one or more of the trained machine learning models 143 by modifying their hyper-parameters. Some of the computational techniques that can be implemented by machine learning model tuner 145 to tune hyper-parameters include grid search techniques, random search techniques, Bayesian regression techniques, and other suitable computation techniques for the automated selection and optimization of machine learning models hyper-parameters. Thus, in some instances, the hyper-parameters of trained machine learning models 143 can be modified by machine learning model tuner 145 to reach optimization and accuracy levels not reached via the training, testing, and evaluation processes.

In some implementations, performance of trained machine learning models 143 can be calculated for each of the trained machine learning models to identify those models exhibiting superior performance. For example, the Area under the Receiver Operating Characteristic (AUROC) or other performance metric can be used to evaluate the performance of each of the trained machine learning models 143. A machine learning model performance metric calculated based on AUROC can be configured with a threshold value that maximizes the number of correctly classified True Positives while minimizing the number of False Positives and False Negatives. Other machine learning performance metrics can be equally used including (1) accuracy which measures the probability of correct classifications, (2) sensitivity which measures the ability to classify True Positives, and (3) specificity, which measures the ability to classify actual benign datasets (True Negatives), (4) Silhouette Coefficient, (5) homogeneity and/or other suitable performance metrics.

The selected performance metric can be used to calculate and compare the performance of each of the trained machine learning models favoring machine learning models that minimize (or significantly reduce) a number of False Positive classifications and minimize (or significantly reduce) a number of False Negative classifications. Thus, based on the result of the selected performance metric(s) the CDS 123 can select one or more of the trained machine learning models 143 for deployment into a production network such as an enterprise network and/or a compute device. For instance, the selected machine learning model(s) can be deployed to be integrated into or to replace a machine learning model used by the cybersecurity detection engine 105 implemented in compute device 101 discussed with reference to FIG. 1.

The trained machine learning models 143 can be configured to operate in active mode, i.e., to operate in-line directly on content blocking digital resources classified as malicious. Likewise, trained machine learning models 143 can be configured to operate in non-blocking or inactive mode. In such a case, the trained machine learning model operates out-of-band on copies of content and the predicted classifications do not result in the blocking of the content. In some instances, trained machine learning models operating in non-blocking or inactive mode can reached different (and more accurate) classifications than those operating in active mode because they do not have to block in real-time malicious digital resources and thus, can allot greater amount of time and/or computation resources in the classification process. Trained machine learning models 143 include instantiated copies of a selected machine learning model and the remaining (not selected) machine learning models. Trained machine learning models are readily available The selected trained machine learning model is available to be deployed to production in active mode (or blocking mode). In some implementations, the remaining, non-selected machine learning models are not put into production but rather reserved for subsequently retraining on other datasets. Alternatively, in other implementations, some or all of the remaining models in the set of trained machine learning models 143 may also be deployed to production but in inactive mode. The trained machine model selected to be in active mode may have, for example, superior performance indicated by highest accuracy rate or lowest error rate within the set, according to at least one metric, and is used in production (in-line) to classify a suspicious digital resources included in an unlabeled production dataset. The prediction (classification and other results) generated by the active machine model may thus lead to issuing an alert to a security administrator or taking other remedial actions, as appropriate, depending on the classification.

The prediction (classification and associated data) from the trained machine learning models deployed to production in inactive mode may be employed later to evaluate whether a different one of the trained machine learning models should replace the active model and become the "new" active model, based on their relative accuracy or error rate according to at least one metric in classification of the suspicious digital resource. In some embodiments, more than one trained machine model may be placed in active mode concurrently (that is, overlapping in a time), for example, those having an accuracy rate above a threshold or error rate below a threshold, or the like, during training, and their results for each suspicious digital resource analyzed during production statistically combined (e.g., probability values averaged) to yield the classification of the suspicious digital resource. During production, the instantiated copies of the deployed machine learning model in active mode and the remaining machine learning models in inactive mode are executed by CDS 123.

Figure 4:
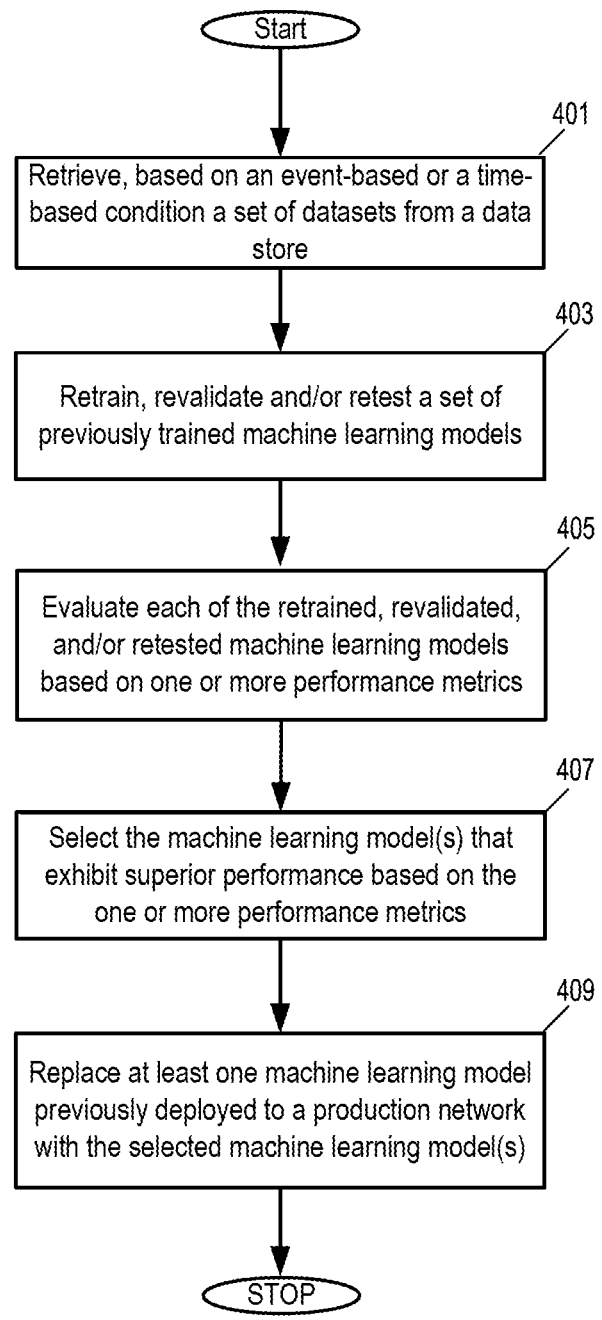
FIG. 4 is a flowchart illustrating a process to retune, retrain, revalidate, and retest machine learning models for the detection of cybersecurity threats, according to an embodiment.

The data modeler 127 repeatedly receives datasets from multiple and different compute devices including compute device 101, virtual environment machine 113 (shown in FIG. 1) and other suitable compute devices coupled to CDS 123 via network 111. The trained machine learning models 143 repeatedly produce classification outputs in an inactive mode in response to the received datasets collected from multiple compute devices coupled to the CDS 123. The machine learning modeler 129 can train new machine learning models selected from the pre-selected machine learning model 137, and/or retrain, revalidate, and/or retune machine learning models selected from the trained machine learning models 143 based on the datasets received by the data modeler 127 over time, as discuss below with reference to FIG. 4.

Monitor 142 can periodically produce performance metrics for the trained machine learning models (e.g., AUROC, as discussed above). In some instances, when the monitor 142 determines that another machine learning model different from the machine learning model currently deployed in active mode exhibits a superior performance by, for example, achieving a significantly better classification accuracy than the currently deployed machine learning model, the CDS 123 replaces the currently deployed machine learning model with the machine learning model that has outperformed it. Thereafter, the outperformed machine learning model can be set to operate in an inactive mode and the machine learning model that has achieved a significantly better performance is set to operate in active mode. As discussed above, the active machine learning model can be deployed to one or more compute devices such as compute device 101 to be integrated into their cybersecurity detection engine 105, and thus the compute device may obtain benefit from the performance achieved by the new active machine learning model.

In some instances, the CDS 123 can determine, based on the new active machine learning model whether is likely that cybersecurity detection engine 105 (FIG. 1) misclassified or erroneously predicted that a digital resource is associated or is not associated with a cyberattack. In such a case, CDS 123 can send to compute device 101 a misclassification signal and collect from compute device 101 data associated with the potential misclassification. Examples of the collected data can include, feature vectors associated with the misclassification, a misclassified digital resource, the classification value, a false positive indication value, a false negative classification value, and/or performance values captured from compute device 101 (e.g., processor 103, network interface 109, and memory 107) while the processor processed the misclassified digital resource.

Figure 3:
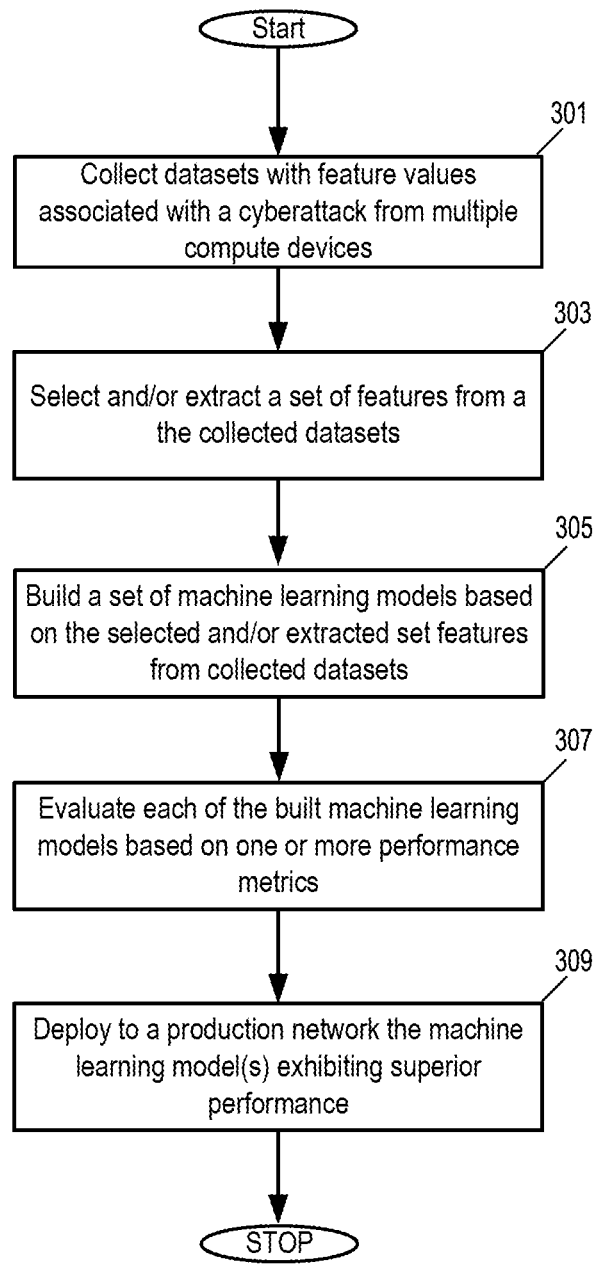
FIG. 3 is a flowchart illustrating a process to build, evaluate, select, and deploy a machine learning model for the detection of cybersecurity threats, according to an embodiment.

An example process executed by the CDS 123 to build the set of trained machine learning models 143 (FIG. 2) is discussed with reference to FIG. 3. As shown in FIG. 3, the CDS 123 collects datasets with feature values associated with a cyberattack from multiple compute devices at 301. At 303, feature values are selected and/or extracted from datasets, including feature values associated with suspicious digital resources and feature values such as performance metrics captured from compute devices at the time when they loaded or executed such digital resources. Thereafter, the CDS 123 builds a set of machine learning models using the selected and/or extracted set of features from the collected datasets at 305. Specifically, the selected set of features are used to train, validate, and test the set of machine learning models. Also, at 305, the built machine learning models are fine-tuned by determining a set of hyper-parameters for each built machine learning model via one or more of the computation techniques executed by machine learning model tuner 145 (FIG. 2). Each of the built machine learning models is evaluated at 307 according to one or more performance metric techniques (e.g., AUROC) and those machine learning models that for example, minimize the number of False Positives and False Negatives are deployed to a production network at 309.

As discussed above, the cybersecurity landscape threat is highly dynamic and unpredictable. Accordingly, to ensure that the CDS 123 repeatedly deploys the most reliable (or close to most reliable) cybersecurity detection engine, CDS 123 repeatedly collects datasets from multiple compute devices, for example, during production, tuning existing machine learning models and/or building new machine learning models as discussed with reference to FIG. 4. Collected datasets can be pre-processed and subjected to feature selection and extraction as discussed above and further stored in, for example, a data store 135 (FIG. 2).

In some implementations, a time-based condition or an event-based condition can be configured into machine learning modeler 129 (shown in FIG. 2), for example, to retrieve new training datasets from a data store (e.g., data store 135 FIG. 2). The new training sets can be received from deployed CDS's including CDS 123 (for example, copies of production datasets analyzed by the CDS's), or can be obtained from other sources including malware forensic laboratories. For example, a time-based condition can be set to retrieve at periodic intervals of time new training datasets from data store 135 (FIG. 2). The new training datasets can be used for training, validating, testing or evaluating one or more machine learning models. Such a time-based condition can be set to be satisfied at an interval of time when CDS 123 likely has collected a useful number of new training datasets, and those datasets had been already processed by data modeler 127, and stored in data store 135.

An event-based condition can be likewise set to retrieve new training datasets from data store 135, such a condition can be set to be satisfied when a predetermined number of new datasets is stored in data store 135, or upon a determination that a sufficient or predetermined threshold number of new types of malware have been recently released by cyber attackers and detected by dataset sources, including CDS's. ("Type of malware" may refer to the specific type of tactics, techniques and procedures (TTPs) used by malware to perpetrate an attack or to the specific identifiable features of malware.) For instance, an event-based condition can be set to retrieve from data store 135 a new training dataset upon a determination that the new training dataset includes a number of feature vectors that reaches a predetermined threshold value and that such feature vectors have not been used yet in the training, validation, and/or evaluation of the set of trained machine learning models 143 (FIG. 2). Thus, at 401 CDS 123 retrieves, based on an event-based or a time-based condition a set of training datasets from a data store. At 403, the CDS 123 builds new machine learning models, and/or tunes, retrains, revalidates, and/or retests trained machine learning models 143 (shown in FIG. 2) with the new training datasets. The machine learning models are evaluated based on one or more performance metrics, at 405. The CDS 123 selects the machine learning model(s) that exhibit superior performance based on the one or more performance metrics, at 407, and replaces a previously deployed, active machine learning model with the selected machine learning model(s), at 409.

It is appreciated that the implementations discussed above provide a solution to the problem of cyberattacks including new types of malware, polymorphic malware, malware that propagates in concealed manners, and malware that remains hidden for a period of time to later exploit security vulnerabilities. The CDS is an end-to-end automated solution that can rapidly deploy trained and tuned machine learning models for the classification of unseen malware.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, solid state storage devices, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The terms "computer", "processor", "computer processor", "compute device", or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), a graphics processing unit (GPU), or any other electronic computing device comprising one or more processors of any kind, or any combination thereof.

As used herein, the phrase "for example," "such as", "for instance", and variants thereof describe non-limiting embodiments of the presently disclosed subject matter. Reference in the specification to "one case", "some cases", "other cases", or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

The invention claimed is:

1. A method for improving a cybersecurity detection system using a plurality of machine learning models, comprising:
   generating a plurality of trained machine learning models, each trained machine learning model from the plurality of trained machine learning models trained to classify whether a digital resource from a first plurality of digital resources is associated with any cyberattack of a plurality of cyberattacks;
   selecting, based on at least one performance metric, a first machine learning model from the plurality of trained machine learning models to operate in an in-line mode and a different second machine learning model from the plurality of trained machine learning models to operate in an out-of-band mode,
   the in-line mode being characterized by classifying a second plurality of digital resources to generate classifications and using the classifications in determining remedial actions including alerts,
   the out-of-band mode being characterized by classifying the second plurality of digital resources to generate classifications without using the classifications in determining a remedial action including alerts even when the classifications indicate an association with a cyberattack of the plurality of cyberattacks;
   deploying, to one or more compute devices via a network, both the first machine learning model and the second machine learning model to classify a third plurality of digital resources;
   evaluating performance following execution of the first machine learning model and the second machine learning model on the one or more compute devices;
   sending a signal to the one or more compute devices to change, based on the performance, a configuration of the first machine learning model and a configuration of the second machine learning model between the in-line mode and the out-of-band mode; and
   deploying, to the one or more compute devices via the network, a third machine learning model different from the first machine learning model and the second machine learning model from the plurality of trained machine learning models to operate in the in-line mode when the first machine learning model and the second machine learning model fail to satisfy a performance threshold.

2. The method of claim 1, wherein the deploying of the third machine learning model causes the one or more compute devices to initiate the remedial action when a statistically-combined classification value of a classification using the first machine learning model and a classification using the third machine learning model indicates a digital resource from the third plurality of digital resources is associated with a cyberattack from the plurality of cyberattacks.

3. The method of claim 1, wherein: when in the out-of-band mode, the second machine learning model classifies the second plurality of digital resources based on copies of the second plurality of digital resources.

4. The method of claim 1, further comprising: receiving, based on an event-based condition, a labeled dataset; and
retraining the plurality of trained machine learning models based on the labeled dataset.

5. The method of claim 4, wherein the event-based condition is met when a number of feature values in a set of feature values received from a set of data sources reaches a predetermined threshold and the set of feature values have not been used to train, validate, or evaluate the plurality of trained machine learning models.

6. The method of claim 4, wherein the event-based condition is met when a predetermined threshold number of new types of malware has been detected via one or more data sources.

7. The method of claim 1, wherein satisfy the performance threshold includes at least one of (i) achieving a performance above an accuracy threshold, or (ii) achieving a performance below an error threshold.

8. The method of claim 1, wherein:
the deploying the third machine learning model includes selecting the third machine learning model from the plurality of trained machine learning models;
the deploying the third machine learning model causes the one or more compute devices to initiate the remedial action when the third machine learning model classifies a digital resource from the third plurality of digital resources as associated with a cyberattack from the plurality of cyberattacks.

9. The method of claim 1, wherein the one or more compute devices include a plurality of compute devices.

10. The method of claim 1, further comprising:
executing the third machine model on a plurality of compute devices including the one or more compute devices to improve cybersecurity in a production network in response to the evaluation of performance.

11. A system for improving cybersecurity detection, comprising:
at least one processor; and
at least one memory storing instructions which, when executed by the at least one processor, causes the at least one processor to:
receive, over a network, at least a subset of machine learning models from a set of machine learning models;
deploy the subset of machine learning models configured to be switched, in response to a received switching signal over the network, between an in-line mode and an out-of-band mode to classify a plurality of digital resources as associated with any cyberattack from a plurality of cyberattacks,
wherein the deployed subset of machine learning models includes both a first machine learning model to operate in the in-line mode and a different second machine learning model to operate in the out-of-band mode, wherein the received switching signal is based on evaluating performance of the first machine learning model and the second machine learning model,
the in-line mode being characterized by classifying digital resources to generate classifications and using the classifications in determining remedial actions including alerts, and
the out-of-band mode being characterized by classifying the digital resources to generate classifications without using the classification in determining a remedial action including alerts even when the classifications indicate an association with a cyberattack from the plurality of cyberattacks; and
execute the subset of machine learning models on a plurality of received digital resources;
initiate one or more remedial actions in response to at least one machine learning model from the subset of machine learning models configured in the in-line mode classifying a digital resource of the plurality of received digital resources as associated with a cyberattack from the plurality of cyberattacks; and
deploy a third machine learning model different from the first machine learning model and the second machine learning model from a plurality of trained machine learning models to operate in the in-line mode when the first machine learning model and the second machine learning model fail to satisfy a performance threshold.

12. The system of claim 11, wherein:
the least one memory further stores instructions which, when executed by the at least one processor, causes the at least one processor to:
in response to the deploying of the third machine learning model, initiate the one or more remedial actions when a statistically-combined classification value of a classification using the first machine learning model and a classification using the third machine learning model indicates a digital resource from the plurality of digital resources is associated with a cyberattack from the plurality of cyberattacks.

13. The system of claim 11, wherein satisfy the performance threshold includes at least one of (i) achieving a performance above an accuracy threshold, or (ii) achieving a performance below an error threshold.

14. The system of claim 11, wherein: when in the out-of-band mode, the second machine learning model classifies the plurality of digital resources based on copies of the plurality of digital resources.

15. A computing device with improved cybersecurity detection using a plurality of machine learning models, comprising:
at least one processor; and
at least one memory storing instructions which, when executed by the at least one processor, causes the at least one processor to:
deploy a first machine learning model and a second machine learning model different from the first machine learning model to classify each digital resource from a plurality of digital resources;
the first machine learning model to operate in an in-line mode and the second machine learning model to operate in an out-of-band mode,
the in-line mode being characterized by classifying digital resources to generate classifications and using the classifications in determining remedial actions including alerts, and
the out-of-band mode being characterized by classifying the digital resources to generate classifications without using the classifications in determining remedial actions including alerts even when the classifications indicate an association with a cyberattack from a plurality of cyberattacks;
execute the first machine learning model and the second machine learning model on each digital resource from the plurality of digital resources or copies thereof;
initiate one or more remedial actions in response to the first machine learning model configured in the in-line mode classifying a first digital resource of the plurality of digital resources as associated with a cyberattack from the plurality of cyberattacks;

receive a switching signal over the network in response to an evaluation of performance of the first machine learning model failing to satisfy at least one performance threshold, the switching signal causing (i) the first machine learning model to operate in the out-of-band mode, and ii) the second machine learning model to operate in the in-line mode, when classifying a second digital resource; and deploy a third machine learning model different from the first machine learning model and the second machine learning model from a plurality of trained machine learning models to operate in the in-line mode when the first machine learning model and the second machine learning model fail to satisfy a performance threshold.

16. The computing device of claim 15, wherein:
the at least one memory storing instructions which causes the at least one processor to:
maintain the first machine learning mode in the in-line mode and the second machine learning mode in the out-of-band mode until receiving a signal to switch between the in-line mode to the out-of-band mode.

17. The computing device of claim 15, wherein:
the least one memory further stores instructions which, when executed by the at least one processor, causes the at least one processor to:
in response to the deploying the third machine learning model, initiate the one or more remedial action when a statistically-combined classification value of a classification using the first machine learning model and a classification using the third machine learning model indicates a digital resource from the plurality of digital resources is associated with a cyberattack from the plurality of cyberattacks.

18. The computing device of claim 15, wherein satisfy the performance threshold includes at least one of (i) achieving a performance above an accuracy threshold, or (ii) achieving a performance below an error threshold.

19. The computing device of claim 15, wherein: when in the out-of-band mode, the second machine learning model classifies the digital resources based on copies of the digital resources.

20. A method for improving a cybersecurity detection system using a plurality of machine learning models, comprising:
generating a plurality of trained machine learning models, each trained machine learning model from the plurality of trained machine learning models trained to classify whether a digital resource from a first plurality of digital resources is associated with any cyberattack of a plurality of cyberattacks;

selecting, based on at least one performance metric, a first machine learning model from the plurality of trained machine learning models to operate in an in-line mode and a different second machine learning model from the plurality of trained machine learning models to operate in an out-of-band mode, the in-line mode being characterized by classifying a second plurality of digital resources to generate classifications and using the classifications in determining remedial actions including alerts, the out-of-band mode being characterized by classifying the second plurality of digital resources to generate classifications without using the classifications in determining a remedial action including alerts even when the classifications indicate an association with a cyberattack of the plurality of cyberattacks;

deploying, to one or more compute devices via a network, both the first machine learning model and the second machine learning model to classify a third plurality of digital resources;

evaluating performance following execution of the first machine learning model and the second machine learning model on the one or more compute devices;

sending a signal to the one or more compute devices to change, based on the performance, a configuration of the first machine learning model and a configuration of the second machine learning model between the in-line mode and the out-of-band mode; and deploying, to the one or more compute devices via the network, a third machine learning model different from the first machine learning model and the second machine learning model from the plurality of trained machine learning models to operate in the in-line mode, causing the one or more compute devices to initiate the remedial action when a statistically-combined classification value of a classification using the first machine learning model and a classification using the third machine learning model indicates a digital resource from the third plurality of digital resources is associated with a cyberattack from the plurality of cyberattacks.

* * * * *